United States Patent
Clark et al.

(10) Patent No.: US 12,503,241 B2
(45) Date of Patent: Dec. 23, 2025

(54) THERMAL MANAGEMENT ASSEMBLY FOR AN AIRCRAFT PROPULSION SYSTEM

(71) Applicant: RTX Corporation, Farmington, CT (US)

(72) Inventors: Thomas E. Clark, Wells, ME (US); Murat Yazici, Glastonbury, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/643,677

(22) Filed: Apr. 23, 2024

(65) Prior Publication Data

US 2025/0326492 A1 Oct. 23, 2025

(51) Int. Cl.
*B64D 27/33* (2024.01)
*B64D 33/08* (2006.01)
*B64D 29/00* (2006.01)

(52) U.S. Cl.
CPC ............ *B64D 27/33* (2024.01); *B64D 33/08* (2013.01); *B64D 29/00* (2013.01)

(58) Field of Classification Search
CPC ........ B64D 27/02; B64D 27/24; B64D 27/33; B64D 33/08; B64D 33/10; B64D 29/00; B64D 35/022–025; F02C 7/12; F02C 7/14; F02K 3/06; F02K 3/105; F02K 3/115; F01D 25/12; F05D 2220/76; F05D 2260/20
See application file for complete search history.

(56) References Cited

U.S. PATENT DOCUMENTS

| | | | |
|---|---|---|---|
| 5,123,242 A | 6/1992 | Miller | |
| 10,094,286 B2 | 10/2018 | Forcier | |
| 11,236,674 B2 | 2/2022 | Caimano | |
| 11,655,762 B2 | 5/2023 | Fish | |
| 2008/0028763 A1* | 2/2008 | Schwarz | ............... F02K 1/1207 60/771 |
| 2019/0145316 A1* | 5/2019 | Schwarz | ................. F02K 3/025 60/728 |
| 2020/0318545 A1* | 10/2020 | Fish | ...................... F28D 1/0478 |
| 2021/0061481 A1 | 3/2021 | Thomassin | |

(Continued)

*Primary Examiner* — Loren C Edwards
(74) *Attorney, Agent, or Firm* — Getz Balich LLC

(57) ABSTRACT

An aircraft propulsion system includes a gas turbine engine, a nacelle, and an electrical assembly. The gas turbine engine includes a rotational assembly and an inner fixed structure. The nacelle includes a nacelle body, a first bifurcation, and a second bifurcation. The nacelle body extends circumferentially about the gas turbine engine. The nacelle body forms an annular bypass duct between the nacelle body and the inner fixed structure. The first bifurcation and the second bifurcation extend between and connect the nacelle body and the inner fixed structure. The electrical assembly includes a motor-generator, a motor control unit, a motor-generator (MG) cooling system, and a motor control unit (MCU) cooling system. The motor-generator is coupled to the shaft. The motor control unit is electrically connected to the motor-generator. The MG cooling system includes a first heat exchanger disposed at the first bifurcation. The MCU cooling system includes a second heat exchanger disposed at the second bifurcation.

16 Claims, 14 Drawing Sheets

(56) References Cited

U.S. PATENT DOCUMENTS

2022/0185494 A1 6/2022 Dubreuil
2023/0365264 A1 11/2023 Moore
2023/0406519 A1 12/2023 Freer

* cited by examiner

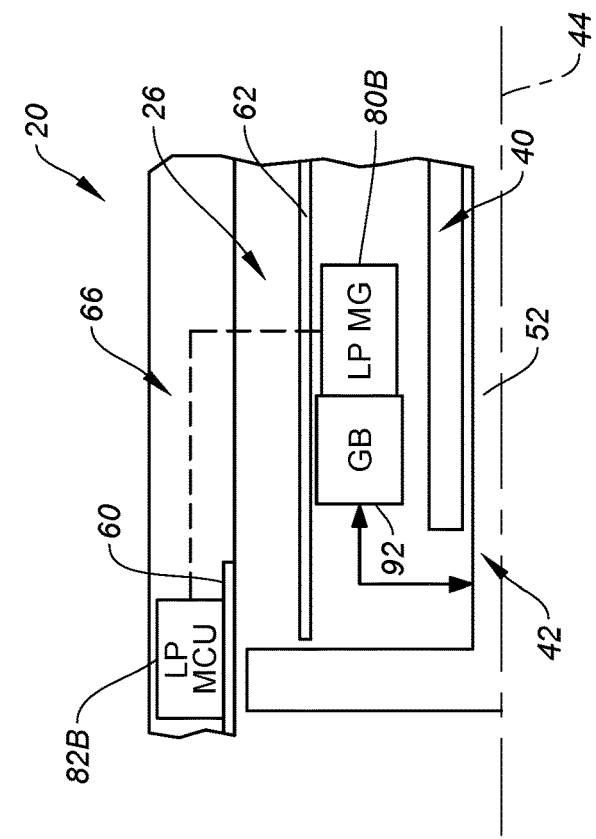
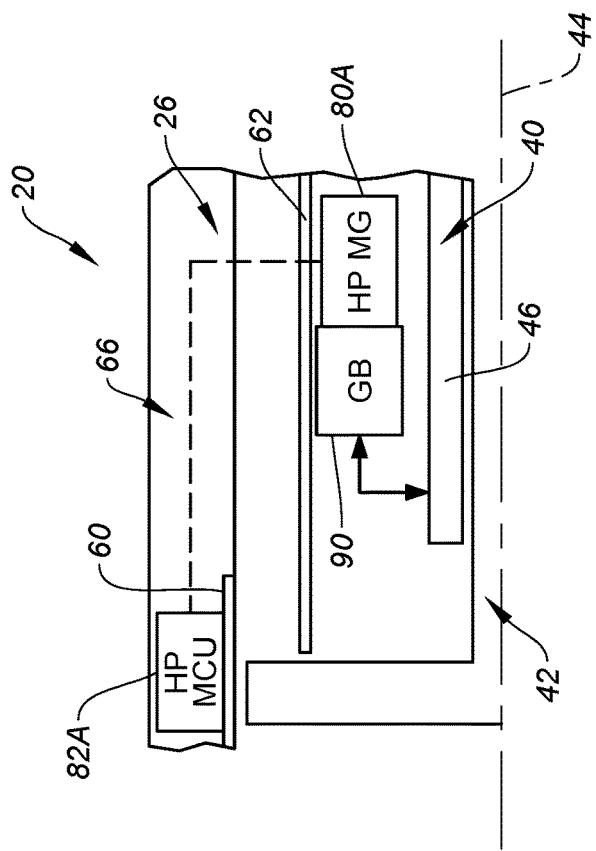

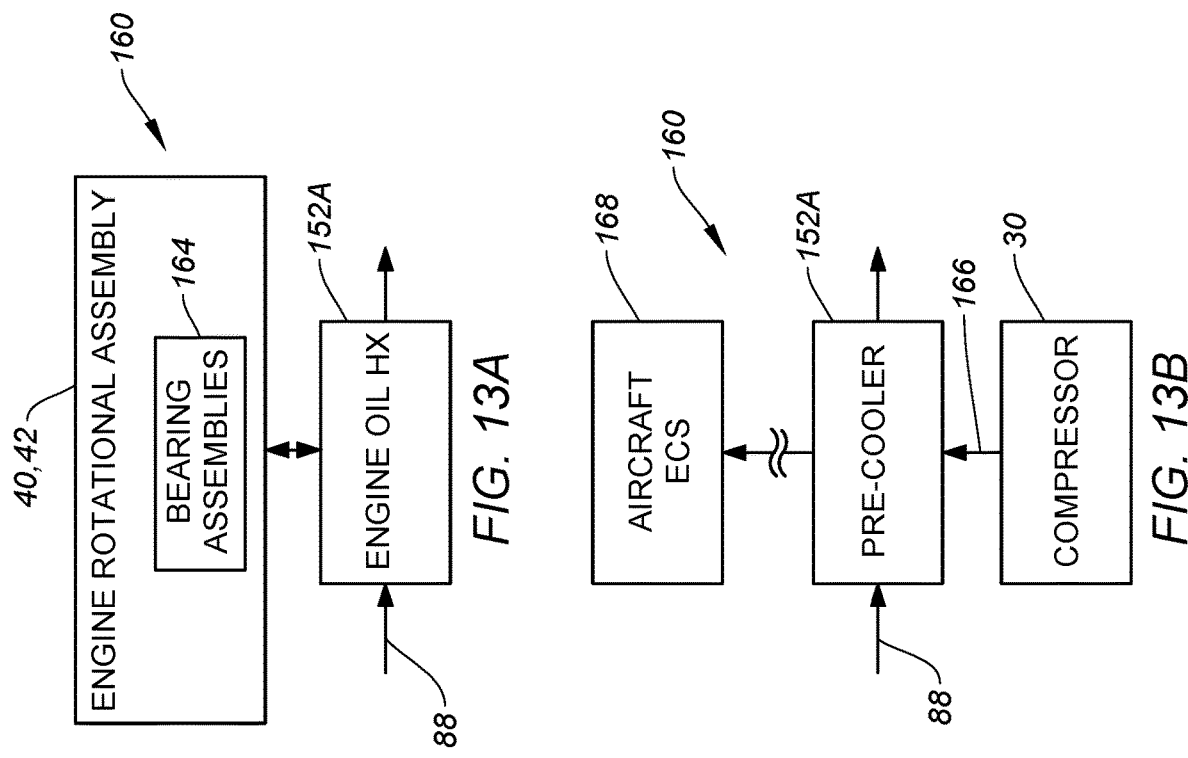
*FIG. 13A*
*FIG. 13B*
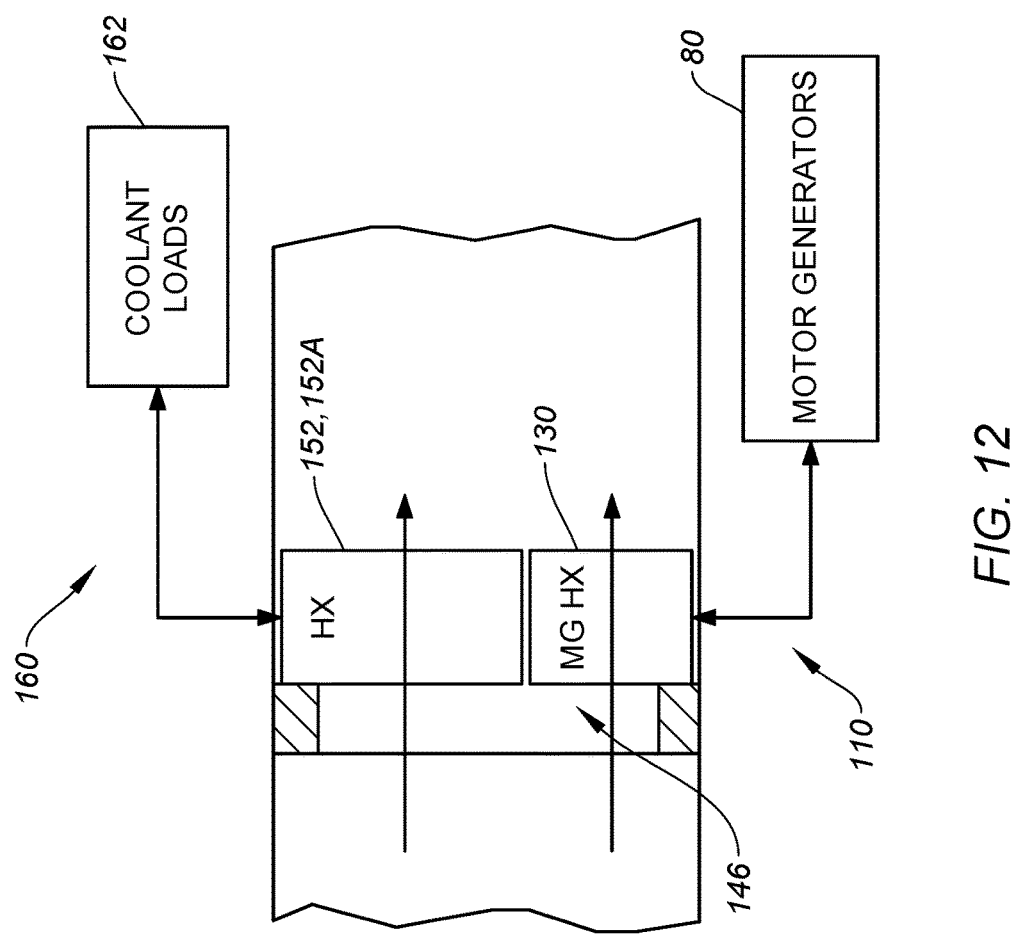
*FIG. 12*

THERMAL MANAGEMENT ASSEMBLY FOR AN AIRCRAFT PROPULSION SYSTEM

BACKGROUND

1. Technical Field

This disclosure relates generally to propulsion systems for aircraft and, more particularly, to thermal management assemblies for motor-generators and motor control units.

2. Background Information

Propulsion systems for aircraft include equipment, such as electric motors, configured to facilitate operation of an engine to provide thrust for an associated aircraft. This equipment may require complex thermal management to facilitate reliable operation in view of the varying temperature extremes and operating conditions experienced by aircraft propulsion systems. Various thermal management systems and methods for aircraft propulsion systems are known in the art. While these known systems and methods may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an aircraft propulsion system includes a gas turbine engine, a nacelle, and an electrical assembly. The gas turbine engine includes a rotational assembly and an inner fixed structure. The rotational assembly is rotatable about a rotational axis of the gas turbine engine. The rotational assembly includes a shaft, a bladed compressor rotor, and a bladed turbine rotor. The shaft interconnects the bladed compressor rotor and the bladed turbine rotor. The inner fixed structure forms an exterior housing of the gas turbine engine. The nacelle includes a nacelle body, a first bifurcation, and a second bifurcation. The nacelle body extends circumferentially about the gas turbine engine. The nacelle body forms an annular bypass duct between the nacelle body and the inner fixed structure. The first bifurcation and the second bifurcation extend between and connect the nacelle body and the inner fixed structure. The electrical assembly includes a motor-generator, a motor control unit, a motor-generator (MG) cooling system, and a motor control unit (MCU) cooling system. The motor-generator is coupled to the shaft. The motor control unit is electrically connected to the motor-generator. The MG cooling system is connected in fluid communication with the motor-generator. The MG cooling system includes a first heat exchanger disposed at the first bifurcation within the annular bypass duct. The MCU cooling system is connected in fluid communication with the motor control unit. The MCU cooling system includes a second heat exchanger disposed at the second bifurcation within the annular bypass duct.

In any of the aspects or embodiments described above and herein, the first bifurcation may form a first heat exchanger assembly including a first bifurcation body, a first heat exchanger housing, and the first heat exchanger. The first bifurcation body and the first heat exchanger housing may form a first air passage through the first heat exchanger. The first bifurcation body may extend between and connect the nacelle body and the inner fixed structure. The first bifurcation body may form a first inlet of the first air passage. The first heat exchanger housing may form a first outlet of the first air passage.

In any of the aspects or embodiments described above and herein, the gas turbine engine further may further include a fluid system including a third heat exchanger. The first heat exchanger assembly may include the third heat exchanger. The first bifurcation body and the first heat exchanger housing may form the first air passage through the first heat exchanger and the third heat exchanger.

In any of the aspects or embodiments described above and herein, the gas turbine engine may further include a bearing assembly rotationally supporting the rotational assembly. The bearing assembly may be connected in fluid communication with the fluid system.

In any of the aspects or embodiments described above and herein, the gas turbine engine may include a compressor section including the bladed compressor rotor. The third heat exchanger may be connected in fluid communication with the compressor section to receive a bleed air flow from the compressor section.

In any of the aspects or embodiments described above and herein, the second bifurcation may form a second heat exchanger assembly including a second bifurcation body, a second heat exchanger housing, and the second heat exchanger. The second bifurcation body and the second heat exchanger housing may form a second air passage through the second heat exchanger. The second bifurcation body may extend between and connect the nacelle body and the inner fixed structure. The second bifurcation body may form a second inlet of the second air passage. The second heat exchanger housing may form a second outlet of the second air passage.

In any of the aspects or embodiments described above and herein, the gas turbine engine may include a fan section and a fan case. The fan case may extend circumferentially about the rotational axis at the fan section. The nacelle body may enclose the fan case. The motor control unit may be disposed on the fan case within the nacelle body.

In any of the aspects or embodiments described above and herein, the MG cooling system may include a first coolant, the MCU cooling system may include a second coolant, and the first coolant may be different than the second coolant.

According to another aspect of the present disclosure, an aircraft propulsion system includes a gas turbine engine, a nacelle, and an electrical assembly. The gas turbine engine includes a first rotational assembly, a second rotational assembly, and an inner fixed structure. The first rotational assembly and the second rotational assembly are rotatable about a rotational axis of the gas turbine engine. Each of the first rotational assembly and the second rotational assembly includes a shaft, a bladed compressor rotor, and a bladed turbine rotor. The shaft interconnects the bladed compressor rotor and the bladed turbine rotor. The inner fixed structure forms an exterior housing of the gas turbine engine. The nacelle includes a nacelle body, a first bifurcation, and a second bifurcation. The nacelle body extends circumferentially about the gas turbine engine. The nacelle body forms an annular bypass duct between the nacelle body and the inner fixed structure. The first bifurcation and the second bifurcation extend between and connect the nacelle body and the inner fixed structure. The electrical assembly includes a first motor-generator, a second motor-generator, a first cooling system, and a second cooling system. The first motor-generator is coupled to the first rotational assembly.

The second motor-generator is coupled to the second rotational assembly. The first cooling system is connected in fluid communication with the first motor-generator. The first cooling system includes a first heat exchanger disposed at the first bifurcation within the annular bypass duct. The second cooling system is connected in fluid communication with the second motor-generator. The second cooling system includes a second heat exchanger disposed at the second bifurcation within the annular bypass duct.

In any of the aspects or embodiments described above and herein, the first bifurcation may form a first heat exchanger assembly including a first bifurcation body, a first heat exchanger housing, and the first heat exchanger. The first bifurcation body and the first heat exchanger housing may form a first air passage through the first heat exchanger. The first bifurcation body may extend between and connect the nacelle body and the inner fixed structure. The first bifurcation body may form a first inlet of the first air passage. The first heat exchanger housing may form a first outlet of the first air passage.

In any of the aspects or embodiments described above and herein, the gas turbine engine may further include a fluid system including a third heat exchanger. The first heat exchanger assembly may include the third heat exchanger. The first bifurcation body and the first heat exchanger housing may form the first air passage through the first heat exchanger and the third heat exchanger.

In any of the aspects or embodiments described above and herein, the second bifurcation may form a second heat exchanger assembly including a second bifurcation body, a second heat exchanger housing, and the second heat exchanger. The second bifurcation body and the second heat exchanger housing may form a second air passage through the second heat exchanger. The second bifurcation body may extend between and connect the nacelle body and the inner fixed structure. The second bifurcation body may form a second inlet of the second air passage. The second heat exchanger housing may form a second outlet of the second air passage.

In any of the aspects or embodiments described above and herein, the electrical assembly may further include a first motor control unit and a second motor control unit. The first motor control unit may be electrically connected to the first motor-generator. The first motor control unit may be connected in fluid communication with the first cooling system. The second motor control unit may be electrically connected to the second motor-generator. The second motor control unit may be connected in fluid communication with the second cooling system.

In any of the aspects or embodiments described above and herein, the gas turbine engine may include a fan section and a fan case. The fan case may extend circumferentially about the rotational axis at the fan section. The nacelle body may enclose the fan case. The first motor control unit and the second motor control unit may be disposed on the fan case within the nacelle body.

In any of the aspects or embodiments described above and herein, the first cooling system may be independent of the second cooling system.

According to another aspect of the present disclosure, an aircraft propulsion system includes a gas turbine engine, a nacelle, and an electrical assembly. The gas turbine engine includes a rotational assembly and an inner fixed structure. The rotational assembly is rotatable about a rotational axis of the gas turbine engine. The rotational assembly includes a shaft, a bladed compressor rotor, and a bladed turbine rotor. The shaft interconnects the bladed compressor rotor and the bladed turbine rotor. The inner fixed structure forms an exterior housing of the gas turbine engine. The nacelle includes a nacelle body, a first bifurcation, and a second bifurcation. The nacelle body extends circumferentially about the gas turbine engine. The nacelle body forms an annular bypass duct between the nacelle body and the inner fixed structure. The first bifurcation and the second bifurcation extend between and connect the nacelle body and the inner fixed structure. The electrical assembly includes a thermal management assembly. The thermal management assembly includes a first heat exchanger and a second heat exchanger. The first heat exchanger is disposed at the first bifurcation within the annular bypass duct. The second heat exchanger is disposed at the second bifurcation within the annular bypass duct.

In any of the aspects or embodiments described above and herein, the thermal management assembly may include a first cooling system and a second cooling system. The first cooling system may include the first heat exchanger. The second cooling system may include the second heat exchanger.

In any of the aspects or embodiments described above and herein, the first cooling system may be independent of the second cooling system.

In any of the aspects or embodiments described above and herein, the gas turbine engine may further include a fluid system including a third heat exchanger. The third heat exchanger may be disposed at the first bifurcation within the annular bypass duct.

In any of the aspects or embodiments described above and herein, the first bifurcation may form a heat exchanger assembly including a bifurcation body, a heat exchanger housing, the first heat exchanger, and the third heat exchanger. The bifurcation body and the heat exchanger housing may form an air passage through the first heat exchanger and the third heat exchanger. The bifurcation body may extend between and connect the nacelle body and the inner fixed structure. The bifurcation body may form an inlet of the air passage. The heat exchanger housing may form an outlet of the air passage.

The present disclosure, and all its aspects, embodiments and advantages associated therewith will become more readily apparent in view of the detailed description provided below, including the accompanying drawings.

BRIEF DESCRIPTION OF THE DRAWINGS

FIGS. 3A-B schematically illustrate portions of an electrical assembly and a gas turbine engine for an aircraft propulsion system, in accordance with one or more embodiments of the present disclosure.

FIG. 12 schematically illustrates a bifurcation heat exchanger assembly including a plurality of heat exchangers, in accordance with one or more embodiments of the present disclosure.

FIGS. 13A-B schematically illustrate fluid systems including a heat exchanger of the bifurcation heat exchanger assembly of FIG. 12, in accordance with one or more embodiments of the present disclosure.

DETAILED DESCRIPTION

Figure 1:
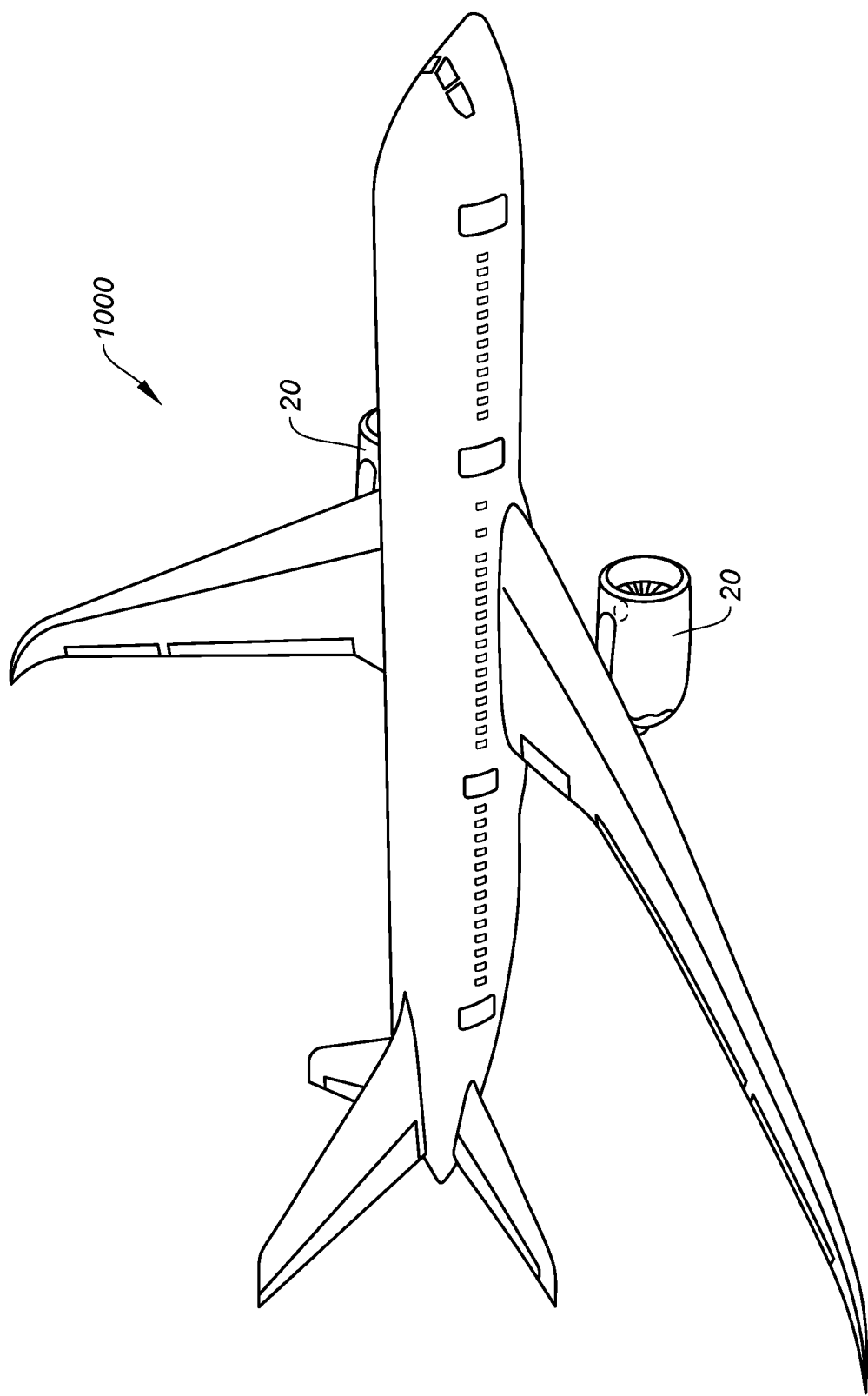
FIG. 1 illustrates a perspective view of an aircraft including a propulsion system, in accordance with one or more embodiments of the present disclosure.
Figure 2:
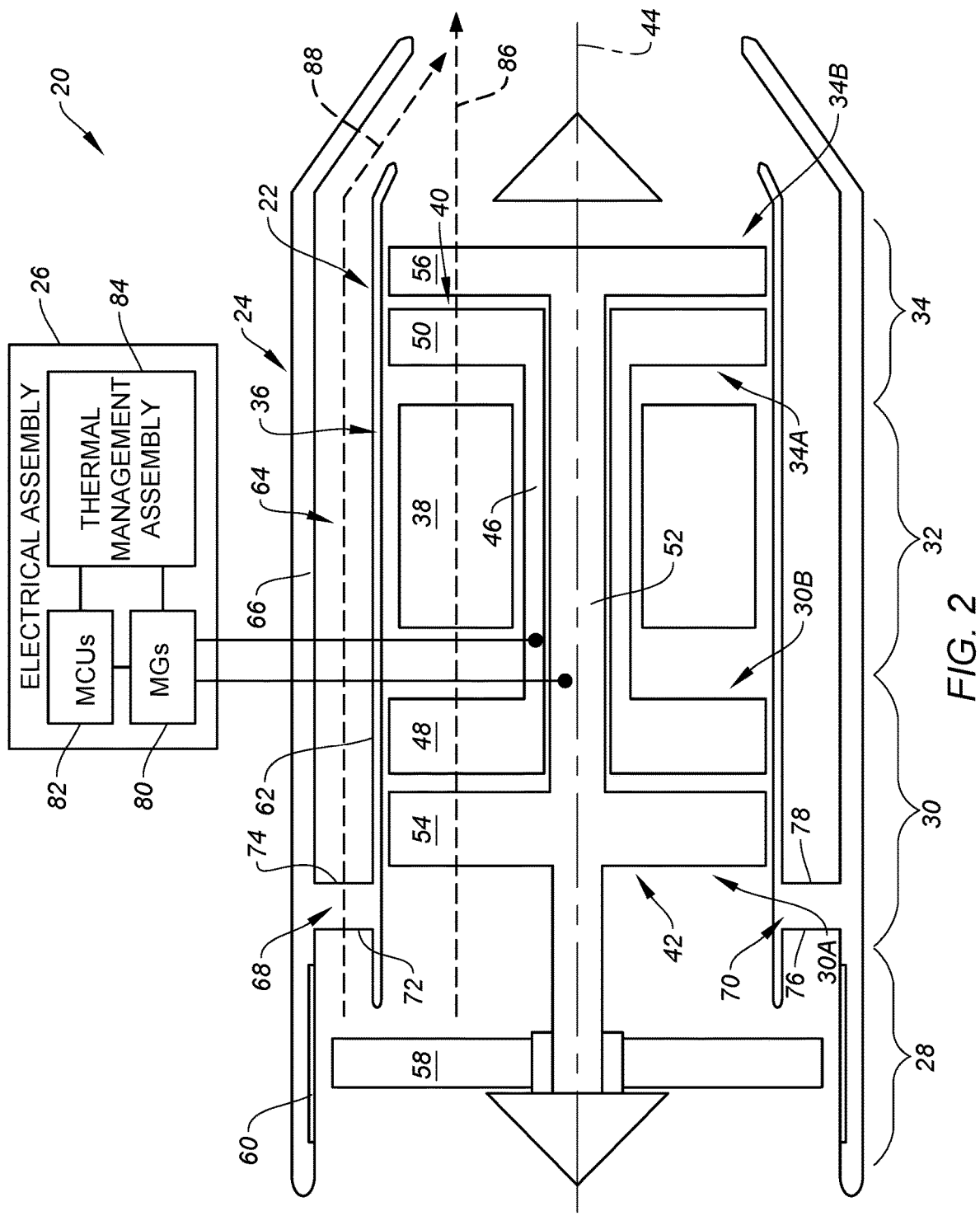
FIG. 2 schematically illustrates a cutaway, side view of a propulsion system for an aircraft, in accordance with one or more embodiments of the present disclosure.

FIG. 1 illustrates a propulsion system 20 for an aircraft 1000. FIG. 2 schematically illustrates a cutaway, side view of the propulsion system 20. The propulsion system 20 of FIG. 2 is configured as a hybrid-electric propulsion system. The present disclosure, however, is not limited to use with hybrid-electric aircraft propulsion systems. The propulsion system 20 includes a gas turbine engine 22, a nacelle 24, and an electrical assembly 26.

The gas turbine engine 22 of FIG. 2 is configured as a multi-spool turbofan gas turbine engine. However, while the following description and accompanying drawings may refer to the turbofan gas turbine engine of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 22 of FIG. 2 includes a fan section 28, a compressor section 30, a combustor section 32, a turbine section 34, and an engine static structure 36. The compressor section 30 includes a low-pressure compressor (LPC) 30A and a high-pressure compressor (HPC) 30B. The combustor section 32 includes a combustor 38 (e.g., an annular combustor). The turbine section 34 includes a high-pressure turbine (HPT) 34A and a low-pressure turbine (LPT) 34B. The compressor section 30, the combustor section 32, and the turbine section 34 may collectively be referred to as an "engine core."

Components of the fan section 28, the compressor section 30, and the turbine section 34 form a first rotational assembly 40 (e.g., a high-pressure spool) and a second rotational assembly 42 (e.g., a low-pressure spool) of the gas turbine engine 22. The first rotational assembly 40 and the second rotational assembly 42 are mounted for rotation about a rotational axis 44 (e.g., an axial centerline) of the gas turbine engine 22 relative to the engine static structure 36.

The first rotational assembly 40 includes a first shaft 46, a bladed first compressor rotor 48 for the high-pressure compressor 30B, and a bladed first turbine rotor 50 for the high-pressure turbine 34A. The first shaft 46 interconnects the bladed first compressor rotor 48 and the bladed first turbine rotor 50.

The second rotational assembly 42 includes a second shaft 52, a bladed second compressor rotor 54 for the low-pressure compressor 30A, a bladed second turbine rotor 56 for the low-pressure turbine 34B, and a bladed fan rotor 58 for the fan section 28. The second shaft 52 interconnects the bladed second compressor rotor 54 and the bladed second turbine rotor 56. The second shaft 52 may additionally interconnect the bladed fan rotor 58 with the bladed second compressor rotor 54 and the bladed second turbine rotor 56. Alternatively, the second shaft 52 may be coupled with the bladed fan rotor 58 by a gear assembly (e.g., a reduction gear box (RGB)). The first shaft 46 and the second shaft 52 are concentric and configured to rotate about the rotational axis 44. The present disclosure, however, is not limited to concentric configurations of the first shaft 46 and the second shaft 52.

The engine static structure 36 may include one or more engine cases, cowlings, bearing assemblies, and/or other non-rotating structures configured to house and/or support (e.g., rotationally support) components of the gas turbine engine 22 sections 28, 30, 32, 34. The engine static structure 36 of FIG. 2 includes a fan case 60 and an inner fixed structure 62. The fan case 60 extends circumferentially about (e.g., completely around) the rotational axis 44 within the fan section 28. The fan case 60 is disposed radially outward of and circumscribes the bladed fan rotor 58. The inner fixed structure 62 extends circumferentially about (e.g., completely around) the rotational axis 44. The inner fixed structure 62 houses and circumscribes the compressor section 30, the combustor section 32, and the turbine section 34 (e.g., the engine core). The inner fixed structure 62 may form an exterior (e.g., an outer radial portion) of the gas turbine engine 22. The fan case 60 and the inner fixed structure 62 form portions of an annular bypass duct 64 of the propulsion system 20. The bypass duct 64 extends axially through the propulsion system 20. The fan case 60 forms an outer radial boundary of the bypass duct 64 along the fan section 28 while the inner fixed structure 62 forms an inner radial boundary of the bypass duct 64.

The nacelle 24 of FIG. 2 includes a nacelle body 66. The nacelle 24 may additionally include an upper bifurcation 68 and a lower bifurcation 70. The nacelle body 66 forms an aerodynamic exterior of the propulsion system 20 and a housing for the gas turbine engine 22. The nacelle body 66 extends circumferentially about (e.g., completely around) the rotational axis 44. The nacelle body 66 extends axially along the rotational axis 44 circumscribing the gas turbine engine 22. The nacelle body 66 is disposed at (e.g., on, adjacent, or proximate) and encloses the fan case 60. The nacelle body 66 further forms portions of the bypass duct 64

(e.g., an outer radial boundary of the bypass duct 64) through the propulsion system 20. The upper bifurcation 68 and the lower bifurcation 70 extend between and to and connect the nacelle body 66 and the inner fixed structure 62. The upper bifurcation 68 and the lower bifurcation 70 extend (e.g., radially extend) through the bypass duct 64. The upper bifurcation 68 extends (e.g., axially extends) between and to a leading end 72 of the upper bifurcation 68 and a trailing end 74 of the upper bifurcation 68. Similarly, the lower bifurcation 70 extends (e.g., axially extends) between and to a leading end 76 of the lower bifurcation 70 and a trailing end 78 of the lower bifurcation 70. The upper bifurcation 68 is disposed opposite the lower bifurcation 70 relative to the rotational axis 44.

As will be discussed in further detail, the electrical assembly 26 of FIG. 2 includes one or more motor-generators (MGs) 80, one or more motor control units (MCUs) 82, and a thermal management assembly 84. The motor-generators 80 may be operably connected to the first rotational assembly 40 (e.g., the first shaft 46) and/or the second rotational assembly 42 (e.g., the second shaft 52) to drive rotation of the rotational assemblies 40, 42 or to be rotationally driven by the rotational assemblies 40, 42 to generate electrical power. The motor control units 82 are electrically connected to the motor-generators 80 to control the operation of the motor-generators 80. For example, each of the motor control units 82 may be electrically connected with a respective one of the motor-generators 80. The motor control units 82 may be connected in signal communication with and controlled by an electronic engine control (EEC) unit, a full authority digital engine control (FADEC) unit, or another control unit of the propulsion system 20 or its gas turbine engine 22. The thermal management assembly 84 is connected in fluid communication with the motor-generators 80 and the motor control units 82 to facilitate cooling of the motor-generators 80 and the motor control units 82.

In operation of the gas turbine engine 22 of FIG. 2, ambient air is directed through the fan section 28 and into a core flow path 86 (e.g., an annular flow path) and a bypass flow path 88 (e.g., an annular flow path) by rotation of the bladed fan rotor 58. Air flow along the core flow path 86 is compressed by the low-pressure compressor 30A and the high-pressure compressor 30B, mixed and burned with fuel in the combustor 38, and then directed through the high-pressure turbine 34A and the low-pressure turbine 34B. The bladed first turbine rotor 50 and the bladed second turbine rotor 56 rotationally drive the first rotational assembly 40 and the second rotational assembly 42, respectively, in response to the combustion gas flow through the high-pressure turbine 34A and the low-pressure turbine 34B. Air flow along the bypass flow path 88 is directed through the bypass duct 64.

Figure 4B:
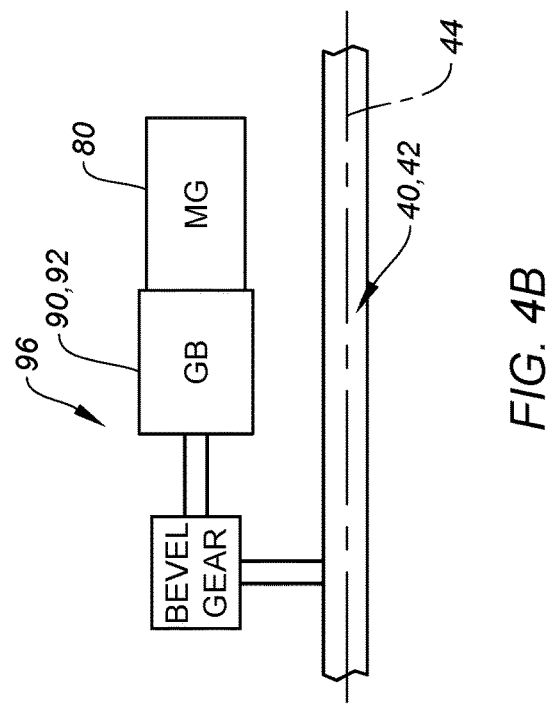
FIG. 4A-B schematically illustrate various configurations of an electrical assembly and a gas turbine engine for an aircraft propulsion system, in accordance with one or more embodiments of the present disclosure.
Figure 4A:
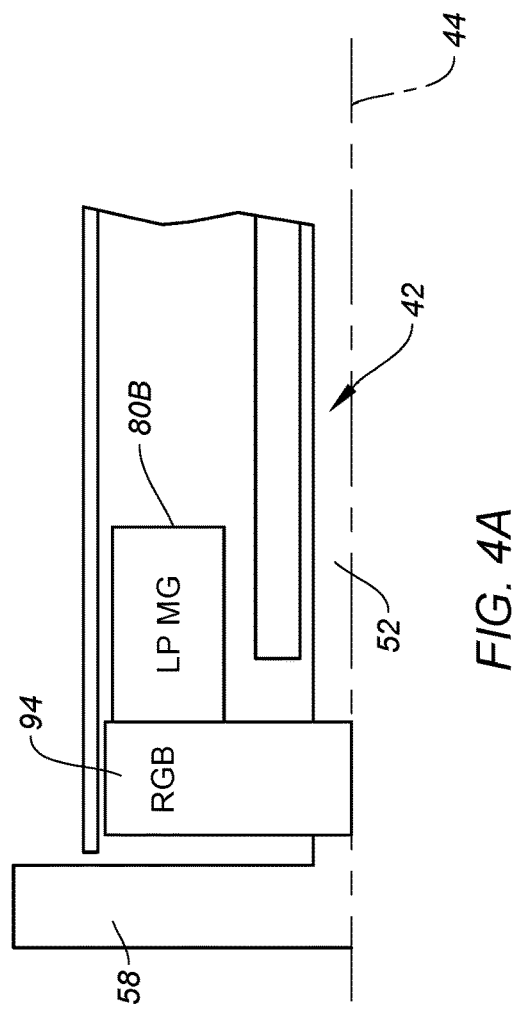

FIGS. 3A and 3B schematically illustrate components of the propulsion system 20 and its electrical assembly 26 in greater detail. Portions of the engine static structure 36 (e.g., engine casings) are omitted from FIGS. 3A and 3B for clarity. The motor-generators 80 may include a motor-generator 80A for the first rotational assembly 40 (hereinafter the "HP motor-generator 80A") and/or a motor-generator 80B for the second rotational assembly 42 (hereinafter the "LP motor-generator 80B"). The motor control units 82 may include a motor-control unit 82A for the HP motor-generator 80A (hereinafter the "HP MCU 82A") and/or a motor-control unit 82B for the LP motor-generator 80B (hereinafter the "LP MCU 82B"). Referring to FIG. 3A, the HP motor-generator 80A is operably connected to the first rotational assembly 40 (e.g., the first shaft 46). For example, the HP motor-generator 80A of FIG. 3A is coupled to the first rotational assembly 40 by a gear box 90. The HP motor-generator 80A and/or the gear box 90 may be disposed at (e.g., on, adjacent, or proximate) the inner fixed structure 62. The HP MCU 82A is electrically connected to the HP motor-generator 80A. The HP MCU 82A is disposed at (e.g., on, adjacent, or proximate) the fan case 60 and within the nacelle body 66. Referring to FIG. 3B, the LP motor-generator 80B is operably connected to the second rotational assembly 42 (e.g., the second shaft 52). For example, the LP motor-generator 80B of FIG. 3B is coupled to the second rotational assembly 42 by a gear box 92. The LP motor-generator 80B and/or the gear box 92 may be disposed at (e.g., on, adjacent, or proximate) the inner fixed structure 62. The LP MCU 82B is electrically connected to the LP motor-generator 80B. The LP MCU 82B is disposed at (e.g., on, adjacent, or proximate) the fan case 60 and within the nacelle body 66. The motor-generators 80 may be operably connected with the first rotational assembly 40 and/or the second rotational assembly 42 using any suitable mechanical coupling. For example, FIG. 4A schematically illustrates the LP motor-generator 80B coupled to the second rotational assembly 42 (e.g., the second shaft 52) by a gear assembly of a gear box 94 (e.g., a reduction gear box (RGB)) coupling the second shaft 52 with the bladed fan rotor 58. For further example, FIG. 4B schematically illustrates one of the motor-generators 80 coupled with one of the rotational assemblies 40, 42 by a bevel gear assembly 96. The present disclosure, however, is not limited to the foregoing exemplary mechanical couplings of the electrical assembly 26 with components of the gas turbine engine 22 (e.g., the first rotational assembly 40 and the second rotational assembly 42).

Figure 5:
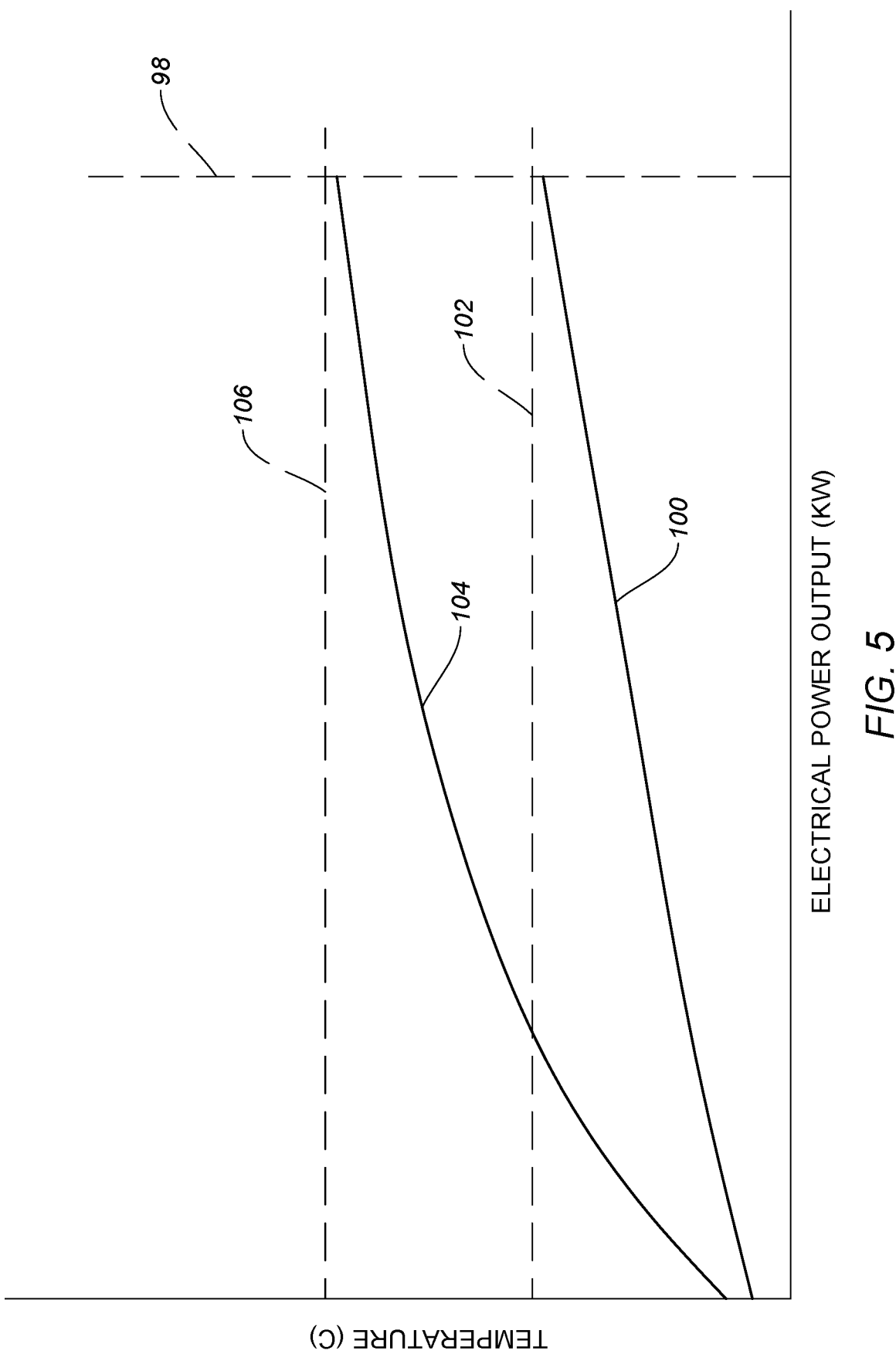
FIG. 5 illustrates a graph depicting exemplary coolant temperatures for motor-generators and motor control units of an electrical assembly for an aircraft propulsion system, in accordance with one or more embodiments of the present disclosure.

Motor-generators (e.g., the motor-generators 80) and motor control units (e.g., the motor control units 82) for a hybrid-electric aircraft propulsion system may include thermally-sensitive electronic equipment which may require thermal management during operation and/or after shutdown of the associated propulsion system. However, the motor-generators and the motor control units may have different temperature control requirements. FIG. 5 illustrates exemplary motor control unit and motor-generator temperatures over a electrical power output range for an electrical assembly of a hybrid-electric aircraft propulsion system. The electrical assembly has a maximum power output 98. The motor control units of the electrical assembly may be understood to have a MCU coolant temperature 100 and a maximum allowable MCU coolant temperature 102. As shown in FIG. 5, the MCU coolant temperature 100 may be expected to increase as the electrical power output of the electrical assembly increases toward the maximum power output 98. Similarly, the motor-generators of the electrical assembly may be understood to have a MG coolant temperature 104 and a maximum allowable MG coolant temperature 106. As shown in FIG. 5, the MG coolant temperature 104 may be expected to increase as the electrical power output of the electrical assembly increases toward the maximum power output 98. As can be understood from FIG. 5, the MG coolant temperature 104 and the maximum allowable MG coolant temperature 106 may be considerably higher than the MCU coolant temperature 100 and the maximum allowable MCU coolant temperature 102, respectively, thereby complicating effective and efficient thermal management.

Figure 6:
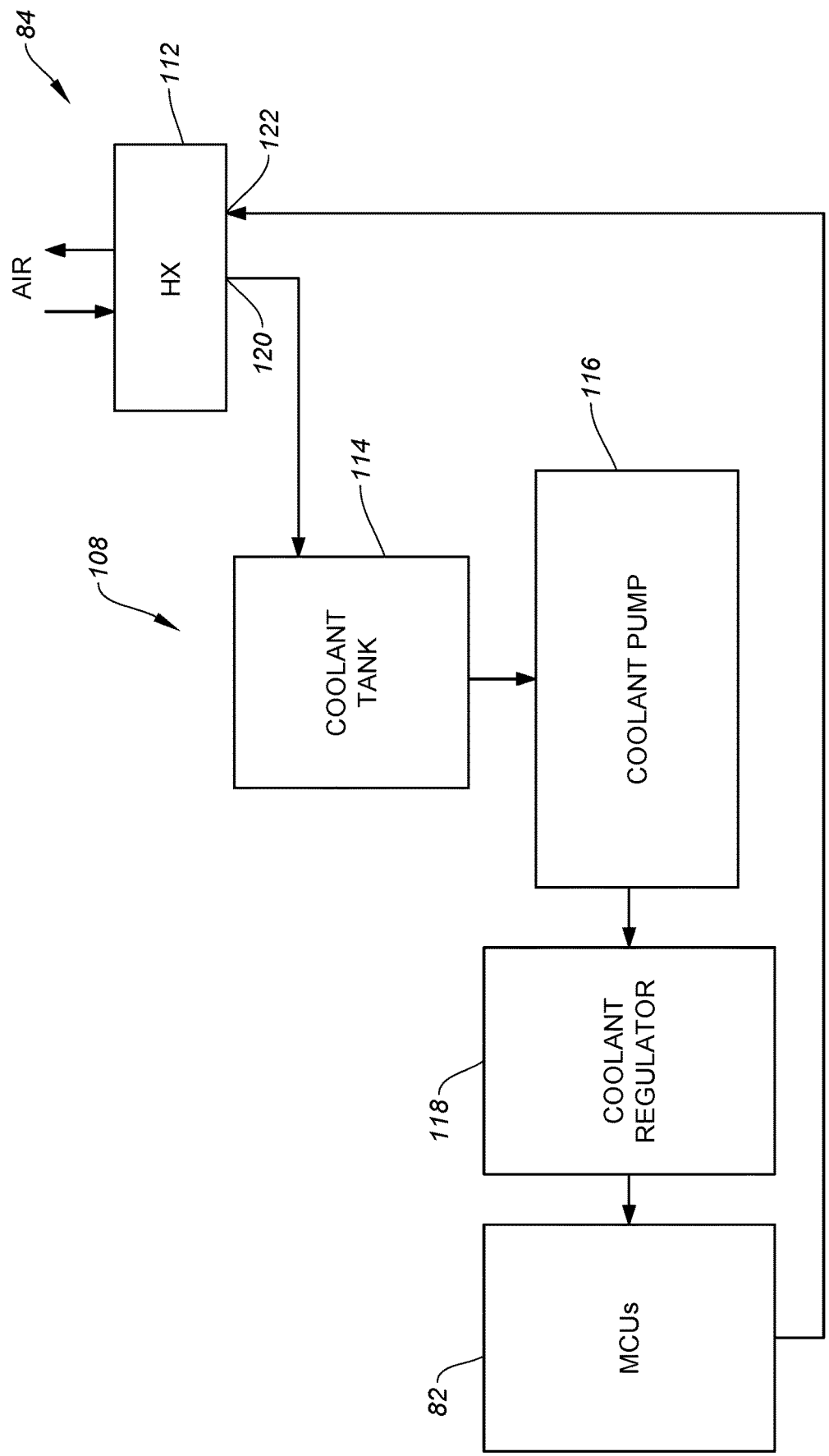
FIG. 6 schematically illustrates a motor control unit cooling system for an aircraft propulsion system, in accordance with one or more embodiments of the present disclosure.
Figure 7:
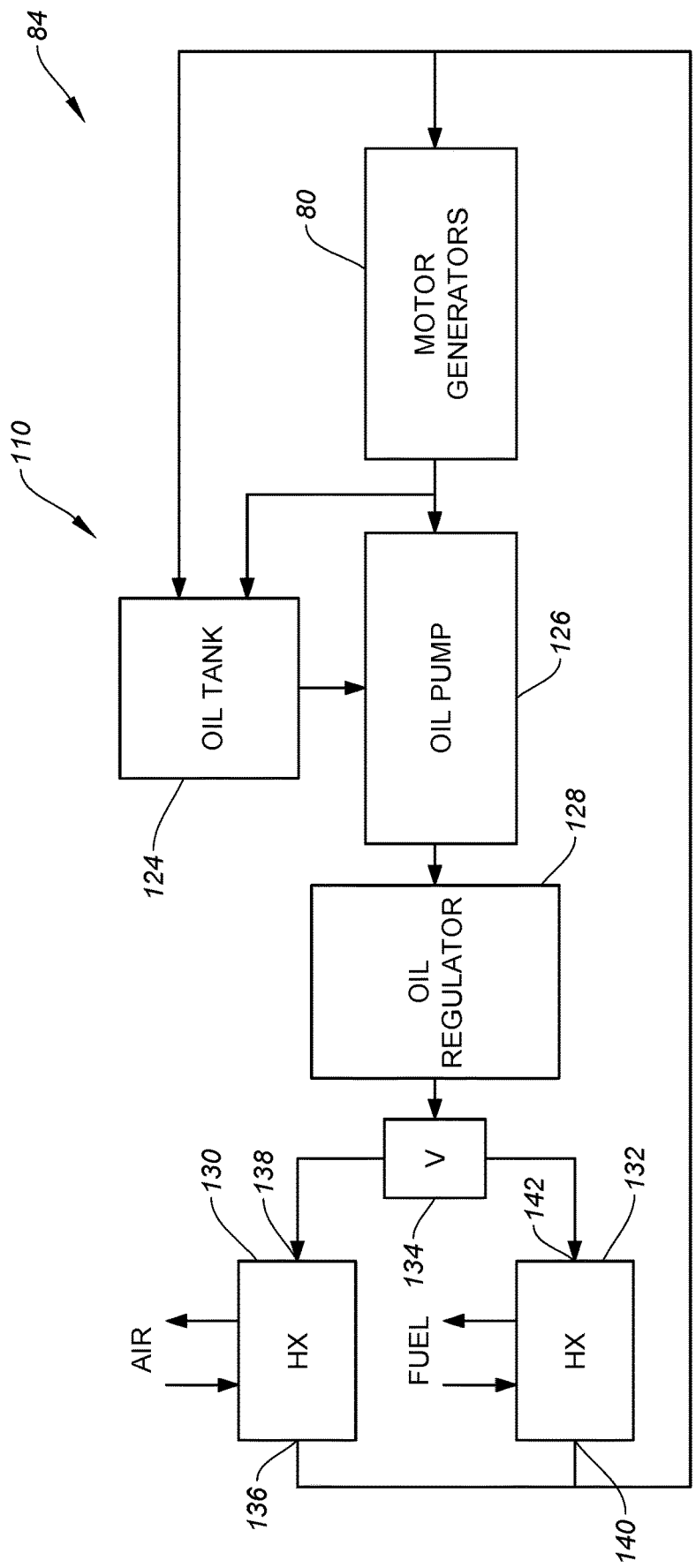
FIG. 7 schematically illustrates a motor-generator cooling system for an aircraft propulsion system, in accordance with one or more embodiments of the present disclosure.

Referring to FIGS. 6 and 7, the thermal management assembly 84 includes a MCU cooling system 108 and a MG cooling system 110. The MCU cooling system 108 and the MG cooling system 110 of FIGS. 6 and 7 are independent of one another. In other words, the MCU cooling system 108 and the MG cooling system 110 do not include shared components or a fluid interconnection. In some embodiments, however, the thermal management assembly 84 may alternatively be configured such that the MCU cooling system 108 and the MG cooling system 110 do not include shared components but are connected in fluid communication by one or more fluid interconnections.

The MCU cooling system 108 of FIG. 6 includes a heat exchanger 112, a coolant tank 114, a coolant pump 116, and a coolant regulator 118. Fluid interconnections between components of the MCU cooling system 108 and the motor control units 82 may be made by any suitable conduit (e.g., pipe, hose, tube, etc.). All or a substantial portion of the components of the MCU cooling system 108 (e.g., the coolant tank 114, the coolant pump 116, the coolant regulator 118) may be disposed at (e.g., on, adjacent, or proximate) the fan case 60. The heat exchanger 112 of FIG. 6 is an air-coolant heat exchanger. For example, the heat exchanger 112 may be disposed within or otherwise connected in fluid communication with the bypass duct 64 to receive air from the bypass duct 64 as a cooling medium for the heat exchanger 112. However, the present disclosure is not limited to any particular cooling medium for the heat exchanger 112. The heat exchanger 112 includes a coolant outlet 120 and a coolant inlet 122. The coolant outlet 120 is connected in fluid communication with the coolant tank 114. The coolant inlet 122 is connected in fluid communication with the motor control units 82. The coolant tank 114 is connected in fluid communication with the coolant pump 116. The coolant pump 116 is configured to draw coolant from the coolant tank 114 and direct (e.g., pump) the coolant to the motor control units 82. The coolant regulator 118 is connected in fluid communication with and between the coolant pump 116 and the motor control units 82. The coolant regulator 118 is configured to control a flow rate of the coolant from the coolant pump 116 to the motor control units 82, for example, to control a coolant temperature of the coolant. Coolant from the motor control units 82 is returned to the heat exchanger 112 (e.g., the coolant inlet 122). The present disclosure is not limited to the foregoing exemplary configuration of the MCU cooling system 108 and the MCU cooling system 108 may include additional or alternative fluid components and/or fluid interconnections within the scope of the present disclosure.

The MG cooling system 110 of FIG. 7 includes an oil tank 124, an oil pump 126, an oil regulator 128, and a heat exchanger 130. The MG cooling system 110 may additionally include a fuel-cooled heat exchanger 132 (e.g., a fuel-oil heat exchanger) and a modulating valve 134. Fluid interconnections between components of the MG cooling system 110 and the motor-generators 80 may be made by any suitable conduit (e.g., pipe, hose, tube, etc.). All or a substantial portion of the components of the MG cooling system 110 (e.g., oil tank 124, the oil pump 126, the oil regulator 128, etc.) may be disposed at (e.g., on, adjacent, or proximate) the engine core, for example, on or within the inner fixed structure 62. The oil tank 124 is connected in fluid communication with the oil pump 126. The oil pump 126 is configured to draw oil from the oil tank 124 and direct (e.g., pump) the oil to and through the heat exchanger 130. The oil regulator 128 is connected in fluid communication with and between the oil pump 126 and the heat exchanger 130. The oil regulator 128 is configured to control a flow rate of the oil from the oil pump 126 to the heat exchanger 130 and, subsequently, to the motor-generators 80, for example, to control a oil temperature of the oil. The heat exchanger 130 of FIG. 7 is an air-cooled heat exchanger (e.g., an air-oil heat exchanger). For example, the heat exchanger 130 may be disposed within or otherwise connected in fluid communication with the bypass duct 64 to receive air from the bypass duct 64 as a cooling medium for the heat exchanger 130. However, the present disclosure is not limited to any particular cooling medium for the heat exchanger 130. The heat exchanger 130 includes an oil outlet 136 and an oil inlet 138. The oil outlet 136 is connected in fluid communication with the motor-generators 80. The oil outlet 136 may additionally be connected in fluid communication with the oil tank 124 to return at least a portion of oil flow through the heat exchanger 130 to the oil tank 124. The oil inlet 138 is connected in fluid communication with the oil regulator 128. Oil from the heat exchanger 130 (e.g., the oil outlet 136) is directed to the motor-generators 80 for cooling and lubrication of the motor-generators 80. Oil from the motor-generators 80 is returned to the oil pump 126 scavenge and/or to the oil tank 124. The present disclosure is not limited to the foregoing exemplary configuration of the MG cooling system 110 and the MG cooling system 110 may include additional or alternative fluid components and/or fluid interconnections within the scope of the present disclosure. Moreover, while the MG cooling system 110 is described herein as an oil system, the MG cooling system 110 may include alternative coolant fluids such as, but not limited to, refrigerants, ammonia-based coolants, ethylene glycol (EG), propylene glycol (PG), or propylene glycol with water (PGW), or other suitable coolant fluid alternatives to oil.

As previously discussed, the MG cooling system 110 may include the fuel-cooled heat exchanger 132 and the modulating valve 134. The fuel-cooled heat exchanger 132 includes an oil outlet 140 and an oil inlet 142. The fuel-cooled heat exchanger 132 may be connected in fluid communication in parallel with the heat exchanger 130 such that the oil outlet 140 is connected in fluid communication with the motor-generators 80 and the oil inlet 142 is connected in fluid communication with and downstream of the oil regulator 128. The fuel-cooled heat exchanger 132 of FIG. 7 is connected in fluid communication with a fuel system of the gas turbine engine 22 to use fuel as a cooling medium for the fuel-cooled heat exchanger 132 (see FIG. 2). For example, the fuel-cooled heat exchanger 132 may heat the fuel prior to introduction into the combustor 38 for combustion while also facilitating cooling of oil for the motor-generators 80. The modulating valve 134 may be connected in fluid communication with and between the oil regulator 128 and the heat exchangers 130, 132 to control a proportion of oil directed to the heat exchanger 130 and the fuel-cooled heat exchanger 132 (e.g., to control a temperature of the fuel).

The independent configuration of the MCU cooling system 108 and MG cooling system 110 facilitates improved temperature control for the motor control units 82 and the motor-generators 80, respectively. Oil for cooling and lubrication of the motor-generators 80 may be maintained at an optimal higher temperature, thereby reducing cooling needs for the MG cooling system 110 oil while still accommodating the lower coolant temperature limits of the motor control units 82 with the MCU cooling system 108. Moreover, the independent configuration of the MCU cooling system 108 and MG cooling system 110 may facilitate use of different coolants for the MCU cooling system 108 and MG cooling system 110. For example, the MCU cooling system 108 may include a coolant such as, but not limited to, ethylene glycol (EG), propylene glycol (PG), or propylene glycol with water (PGW), which may facilitate improved cooling of the motor control units 82 relative to the oil used by the MG cooling system 110. As a result of the improved cooling efficiency of the MCU cooling system 108 and the MG cooling system 110, in combination with reduced piping and flow control components for interconnecting both the motor-generators 80 and the motor control units 82 with a single cooling system, a total weight of the thermal management assembly 84 may be reduced, compared to at least some other conventional assemblies.

Figure 8:
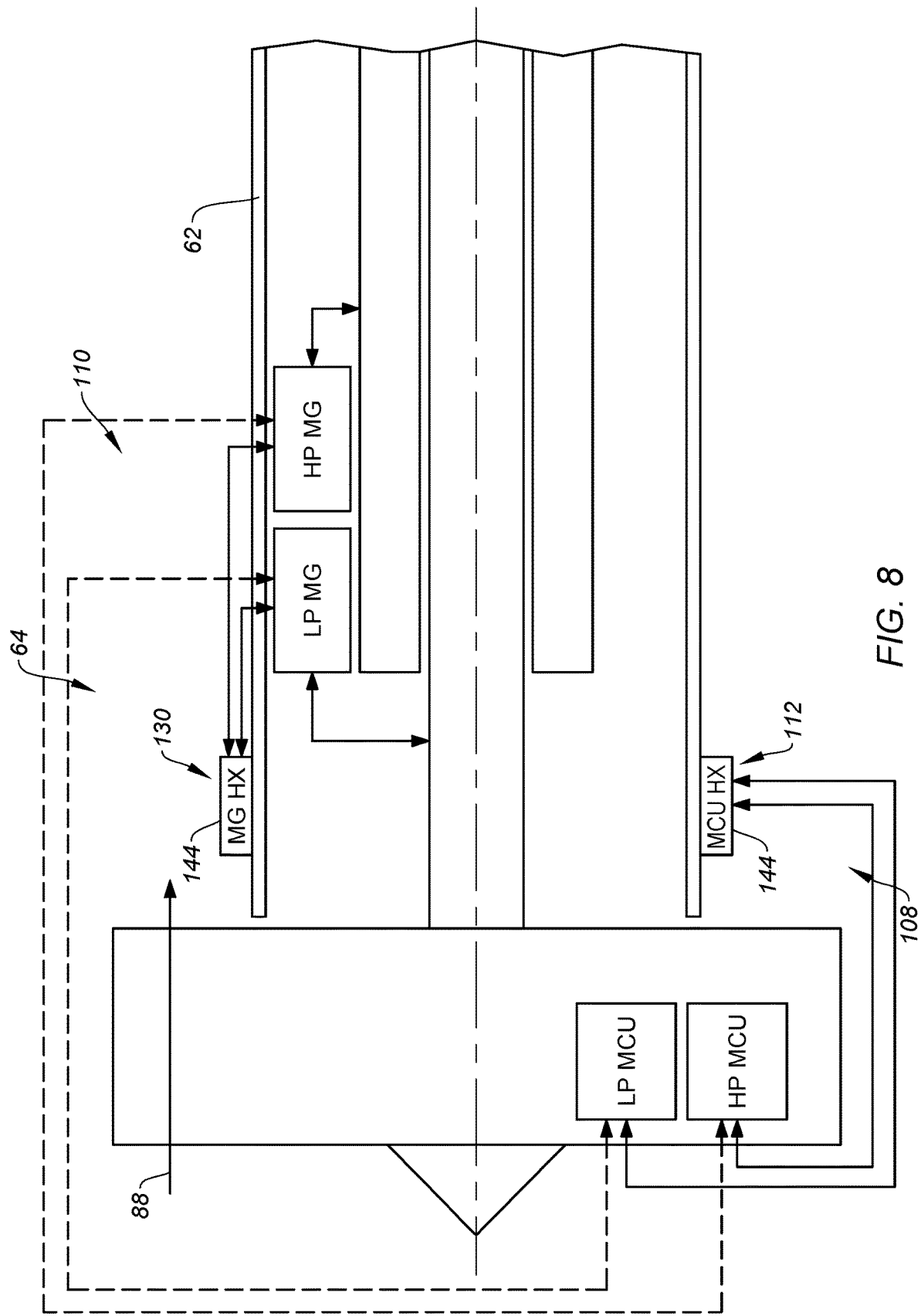
FIG. 8 schematically illustrates portions of a motor-generator cooling system and a motor control unit cooling system for an aircraft propulsion system, in accordance with one or more embodiments of the present disclosure.
Figure 9:
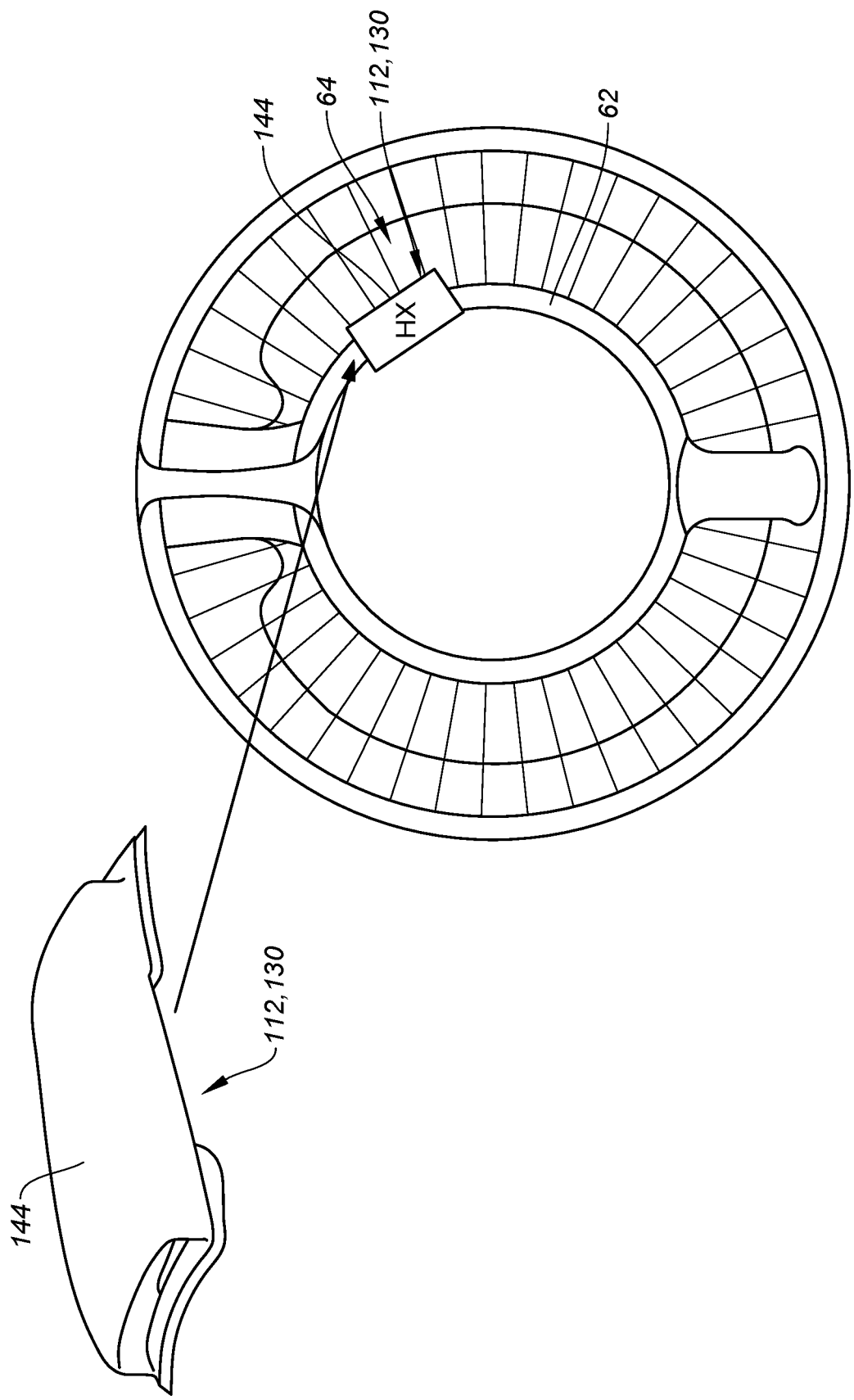
FIG. 9 illustrates an exploded view of a heat exchanger including a scoop, in accordance with one or more embodiments of the present disclosure.

Referring to FIGS. 8 and 9, in some embodiments, the heat exchanger 112 and/or the heat exchanger 130 may be disposed within the bypass duct 64 at (e.g., on, adjacent, or proximate) the inner fixed structure 62. For example, as shown in FIG. 9, the heat exchanger 112 and/or the heat exchanger 130 may include a scoop body 144 mounted to or otherwise disposed at (e.g., on, adjacent, or proximate) the inner fixed structure 62 within the bypass duct 64. The scoop body 144 is configured to direct air flow along the bypass flow path 88 into and through the heat exchanger 112, 130 to facilitate cooling for the MCU cooling system 108 and/or the MG cooling system 110.

Figure 10:
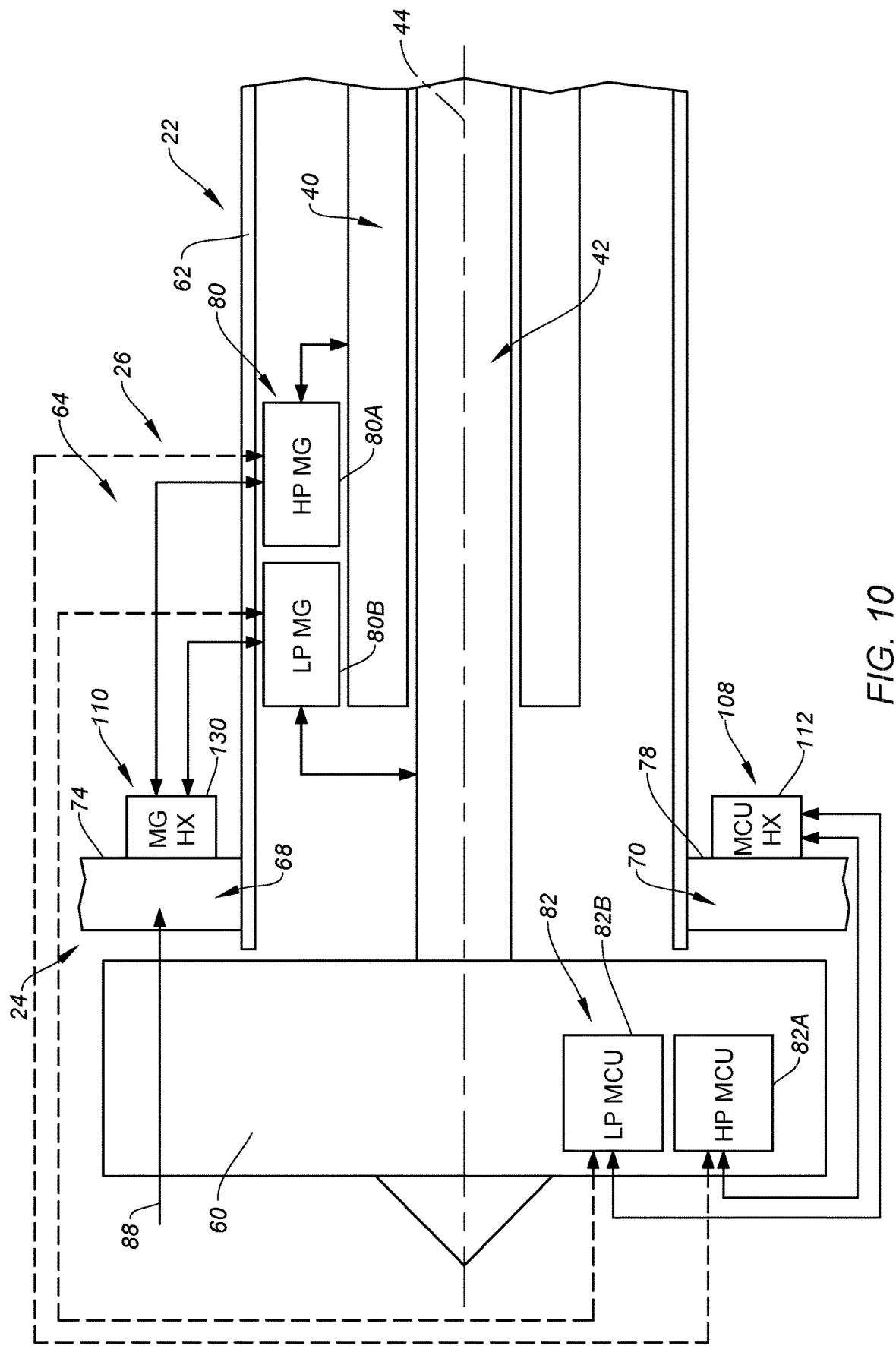
FIG. 10 schematically illustrates an exemplary arrangement of components of an electrical assembly, a motor control unit cooling system, and a motor-generator cooling system relative to a gas turbine engine, in accordance with one or more embodiments of the present disclosure.

FIG. 10 schematically illustrates an arrangement of components of the electrical assembly 26, the MCU cooling system 108, and the MG cooling system 110 relative to the gas turbine engine 22 and the nacelle 24. Components of the MCU cooling system 108 and the MG cooling system 110 are omitted for clarity (see FIGS. 6 and 7). As previously discussed, the motor control units 82 (e.g., the HP MCU 82A and the LP MCU 82B) are disposed at (e.g., on, adjacent, or proximate) the fan case 60. This location of the motor control units 82 facilitates reduced environmental temperatures of the motor control units 82, for example, in comparison to locations proximate the motor-generators 80 (e.g., the HP motor-generator 80A and the LP motor-generator 80B) and/or the engine core. In some embodiments, as shown in FIG. 10, the heat exchanger 112 of the MCU cooling system 108 may be disposed at (e.g., on, adjacent, or proximate) the lower bifurcation 70 and within the bypass duct 64 (e.g., the bypass flow path 88). For example, the heat exchanger 112 may be mounted to or otherwise disposed on the trailing end 78. In some embodiments, as shown in FIG. 10, the heat exchanger 130 of the MG cooling system 110 may be disposed at (e.g., on, adjacent, or proximate) the upper bifurcation 68 and within the bypass duct 64 (e.g., the bypass flow path 88). For example, the heat exchanger 130 may be mounted to or otherwise disposed on the trailing end 74. The installation of the heat exchanger 130 and the heat exchanger 112 at (e.g., on, adjacent, or proximate) the upper bifurcation 68 and the lower bifurcation 70, respectively, facilitates reduced drag losses incurred by the heat exchangers 112, 130 within the bypass duct 64, for example, in comparison to a scoop heat exchanger configuration (see FIGS. 8-9). The independent configuration of the MCU cooling system 108 and the MG cooling system 110 facilitates the arrangement of FIG. 10 and, for example, eliminates the need to route coolant lines between the fan case 60 and the engine core of the gas turbine engine 22.

Figure 11:
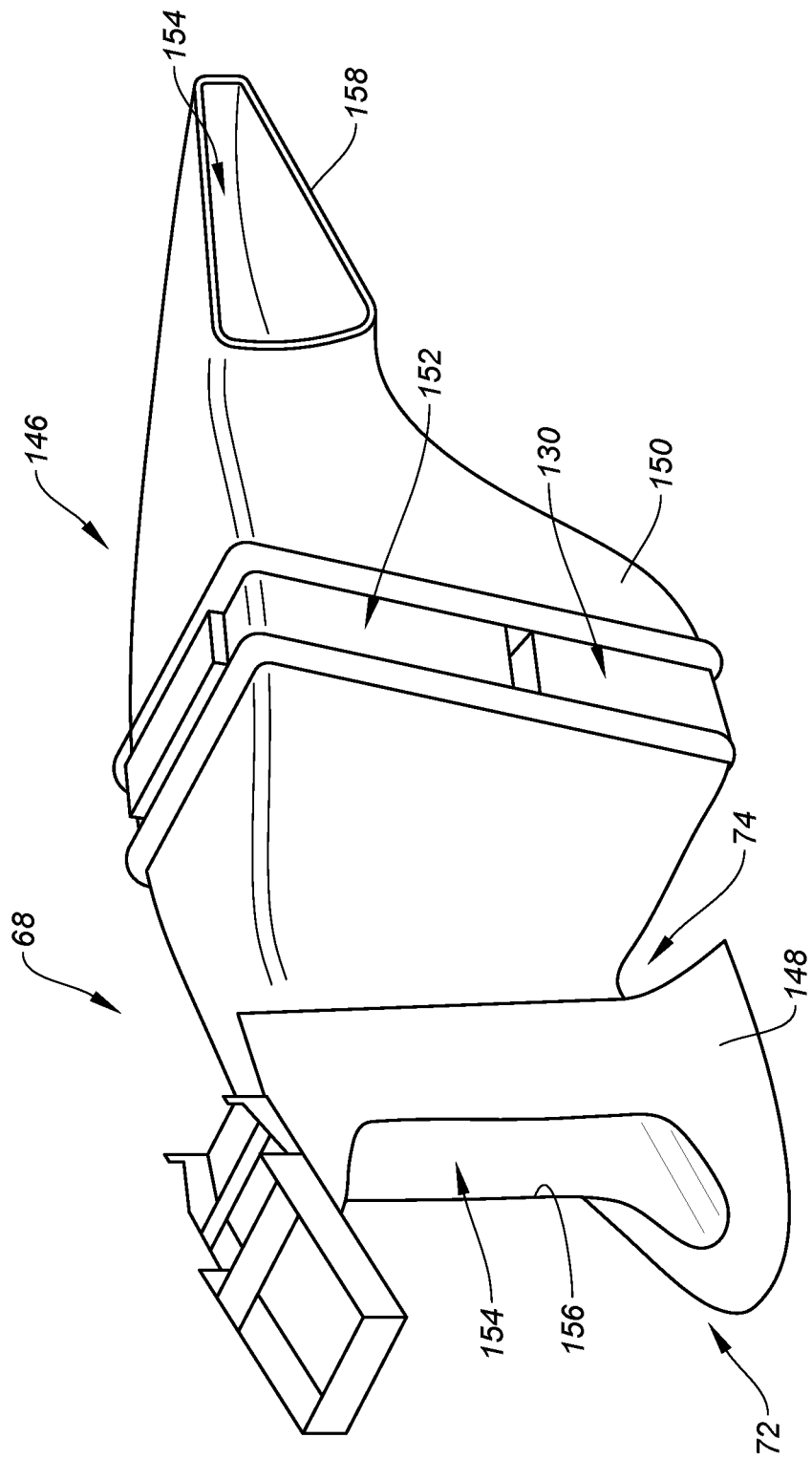
FIG. 11 illustrates a perspective view of a heat exchanger assembly including a bifurcation, in accordance with one or more embodiments of the present disclosure.

Referring to FIG. 11, in some embodiments, the upper bifurcation 68 may form a heat exchanger assembly 146 including the heat exchanger 130. The heat exchanger assembly 146 of FIG. 11 includes a bifurcation body 148, a heat exchanger housing 150, and the heat exchanger 130. The heat exchanger assembly 146 may also include one or more additional heat exchangers 152. The bifurcation body 148 extends between and connects the nacelle body 66 and the inner fixed structure 62 (see FIG. 2). The bifurcation body 148 forms a portion of an air passage 154 (e.g., an inlet 156 of the air passage 154) of the heat exchanger assembly 146, which portion extends (e.g., axially extends) through the bifurcation body 148 from the leading end 72 to the trailing end 74. The heat exchanger housing 150 is disposed within the bypass duct 64 (see FIG. 10) and mounted to or otherwise disposed at (e.g., on, adjacent, or proximate) the trailing end 74. The heat exchanger housing 150 further forms the air passage 154. The heat exchanger housing 150 supports the heat exchanger 130 (and the heat exchangers 152) and directs air from the bypass flow path 88 through the heat exchanger 130 (and the heat exchangers 152). The heat exchanger housing 150 forms an outlet 158 of the air passage 154 downstream of the heat exchanger 130 (and the heat exchangers 152) relative to a direction of air flow through the air passage 154.

As previously discussed, the heat exchanger assembly 146 may include the heat exchangers 152. The heat exchangers 152 may be configured to facilitate thermal management (e.g., cooling) of one or more fluid systems independent of the MG cooling system 110. For example, FIG. 12 schematically illustrates the MG cooling system 110 and a second fluid system 160. The heat exchanger assembly 146 of FIG. 12 includes the heat exchanger 130 and a heat exchanger 152A for the second fluid system 160. The heat exchanger 152A is connected in fluid communication with one or more coolant loads 162 of the second fluid system 160. The heat exchanger 152A is configured to facilitate thermal management (e.g., cooling) of a coolant fluid for the one or more coolant loads 162. FIG. 13A schematically illustrates an exemplary configuration of the second fluid system 160. The second fluid system 160 of FIG. 13A is configured as an engine oil system for one or more bearing assemblies 164 (e.g., the coolant loads 162) or other oil lubricated or cooled components of one or both of the rotational assemblies 40, 42 (see FIG. 2). The heat exchanger 152A is configured to facilitate cooling of an engine oil for the bearing assemblies 164 and/or other engine oil loads. The MG cooling system 110 and the second fluid system 160 (e.g., the engine oil system) may be independent of one another such that the MG cooling system 110 and the second fluid system 160 do not include shared components or a fluid interconnection. This independent configuration of the MG cooling system 110 and the second fluid system 160 may facilitate continued operation of the gas turbine engine 22 in the event of a failure of the MG cooling system 110, for example, in comparison to at least some conventional oil systems which may facilitate supplying and cooling oil for both gas turbine rotational assemblies (e.g., spools), bearing assemblies, and hybrid-electric system (e.g., motor-generators and/or motor control units) together. FIG. 13B schematically illustrates another exemplary configuration of the second fluid system 160. The heat exchanger 152A of the second fluid system 160 is configured as a pre-cooler for cooling compressor bleed air 166 from the compressor section 30 prior to supplying the compressor bleed air 166 to an environmental control system (ECS) 168 of the aircraft 1000 (see FIG. 1). It should be understood, however, that the present disclosure is not limited to the foregoing exemplary configurations of the second fluid system 160.

Figure 14:
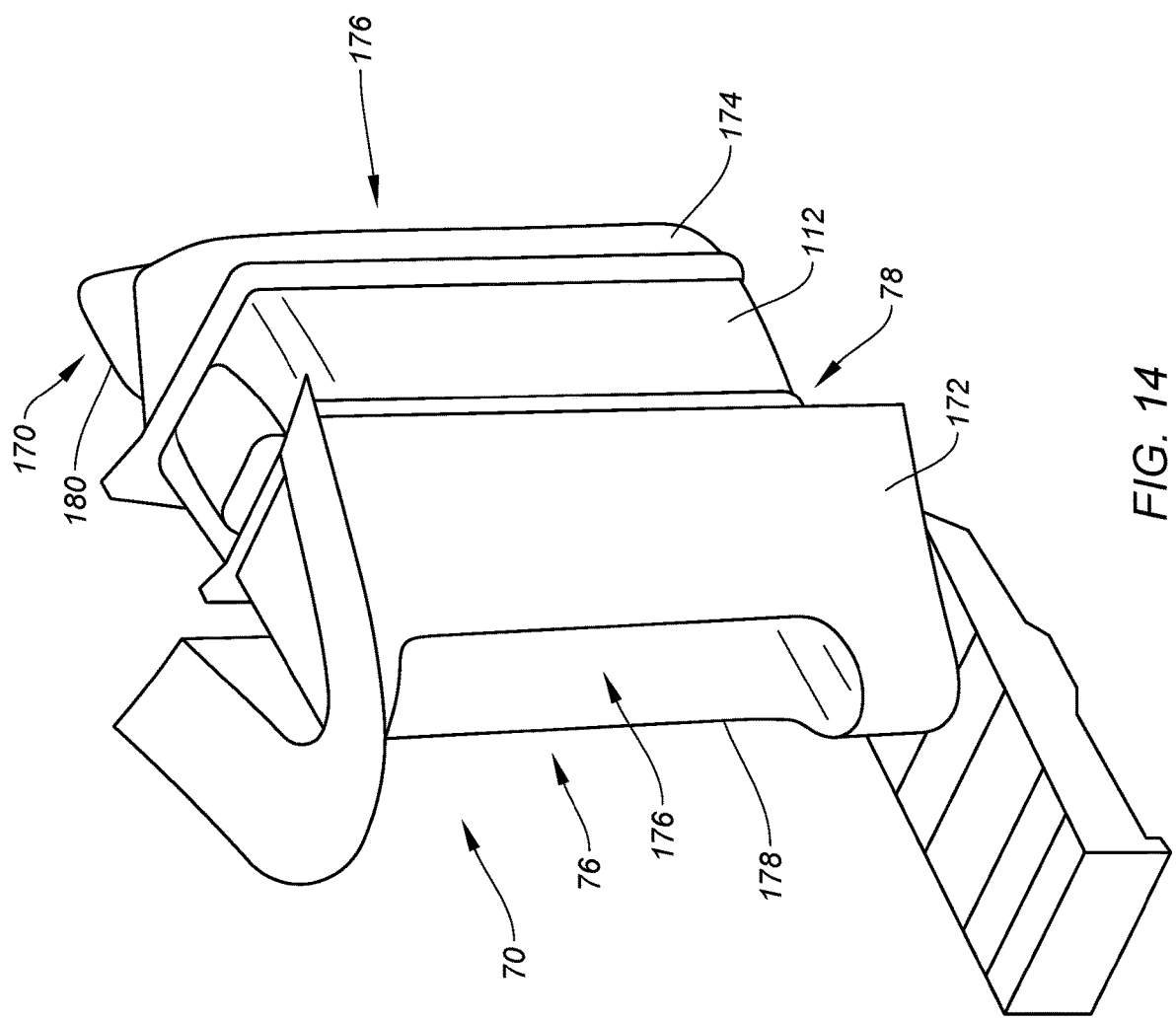
FIG. 14 illustrates a perspective view of another heat exchanger assembly including a bifurcation, in accordance with one or more embodiments of the present disclosure.

Referring to FIG. 14, in some embodiments, the lower bifurcation 70 may form a heat exchanger assembly 170 including the heat exchanger 112. The heat exchanger assembly 170 of FIG. 14 includes a bifurcation body 172, a heat exchanger housing 174, and the heat exchanger 112.

Similar to the heat exchanger assembly 146 (see FIG. 11), the heat exchanger assembly 170 may also include one or more additional heat exchangers (not shown). The bifurcation body 172 extends between and connects the nacelle body 66 and the inner fixed structure 62 (see FIG. 2). The bifurcation body 172 forms a portion of an air passage 176 (e.g., an inlet 178 of the air passage 176) of the heat exchanger assembly 146, which portion extends (e.g., axially extends) through the bifurcation body 172 from the leading end 76 to the trailing end 78. The heat exchanger housing 174 is disposed within the bypass duct 64 and mounted to or otherwise disposed at (e.g., on, adjacent, or proximate) the trailing end 78. The heat exchanger housing 174 further forms the air passage 176. The heat exchanger housing 174 supports the heat exchanger 112 and directs air from the bypass flow path 88 through the heat exchanger 112. The heat exchanger housing 174 forms an outlet 180 of the air passage 176 downstream of the heat exchanger 112 relative to a direction of air flow through the air passage 176.

Figure 15:
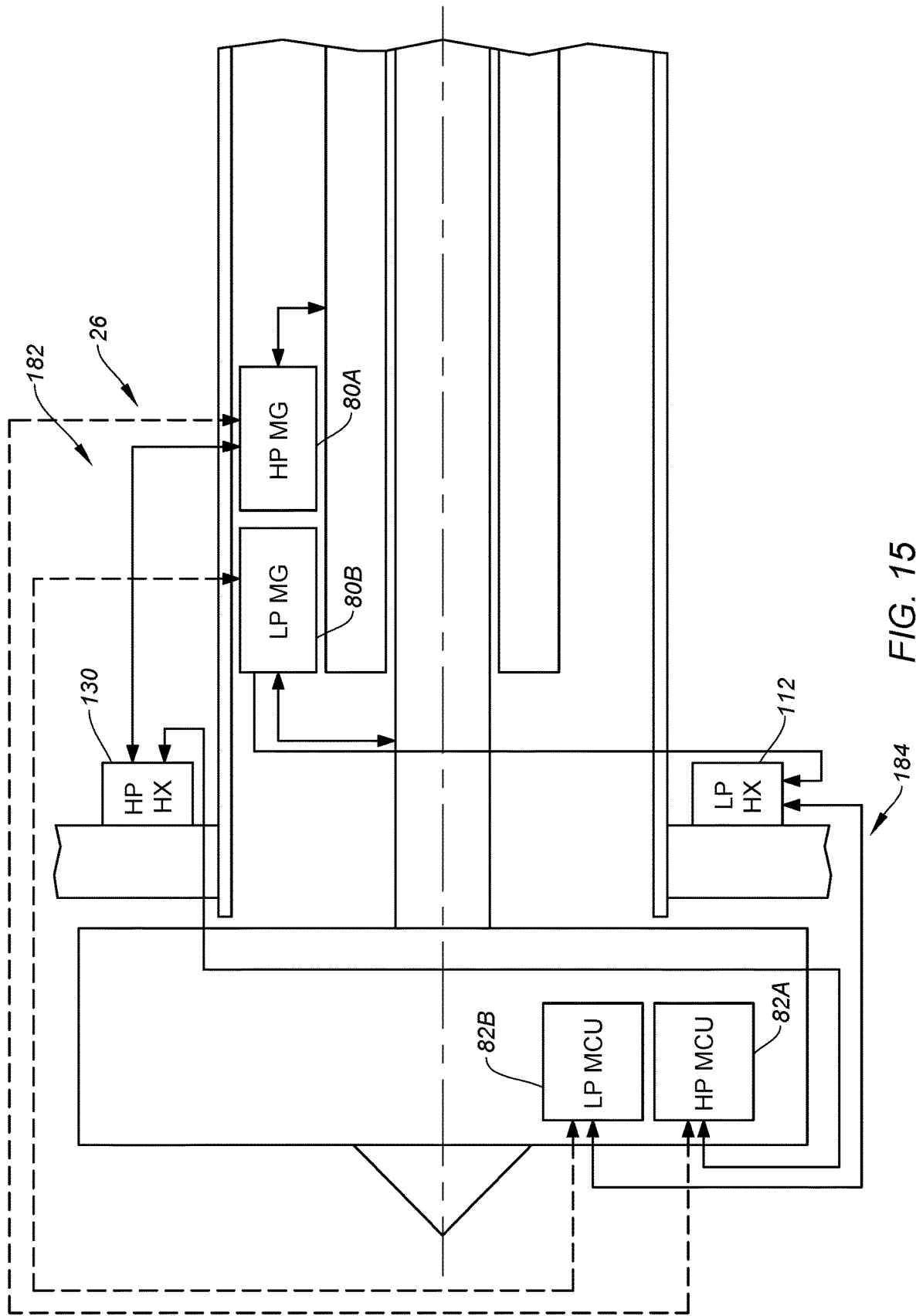
FIG. 15 schematically illustrates an exemplary arrangement of components of an electrical assembly, a motor control unit cooling system, and a motor-generator cooling system, in accordance with one or more embodiments of the present disclosure.

FIG. 15 schematically illustrates another arrangement of components of the electrical assembly 26. In the arrangement of FIG. 15, the HP motor-generator 80A and the HP MCU 82A are connected in fluid communication with the heat exchanger 130 which forms a portion of a HP cooling system 182 for the HP motor-generator 80A and the HP MCU 82A. Similarly, in the arrangement of FIG. 15, the LP motor-generator 80B and the LP MCU 82B are connected in fluid communication with the heat exchanger 112 which forms a portion of a LP cooling system 184 for the LP motor-generator 80B and the HP MCU 82B. The HP cooling system 182 and the LP cooling system 184 of FIG. 15 are independent of one another. In other words, the HP cooling system 182 and the LP cooling system 184 do not include shared components or a fluid interconnection. The independent configuration of the HP cooling system 182 and the LP cooling system 184 facilitates continued operation of one of the HP motor-generator 80A or the LP motor-generator 80B in the event of a failure of the cooling system (e.g., the HP cooling system 182 or the LP cooling system 184) for the other of the HP motor-generator 80A or the LP motor-generator 80B.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An aircraft propulsion system comprising:
  a gas turbine engine including a rotational assembly and an inner fixed structure, the rotational assembly is rotatable about a rotational axis of the gas turbine engine, the rotational assembly includes a shaft, a bladed compressor rotor, and a bladed turbine rotor, the shaft interconnects the bladed compressor rotor and the bladed turbine rotor, the inner fixed structure forms an exterior housing of the gas turbine engine;

a nacelle including a nacelle body, a first bifurcation, and a second bifurcation, the nacelle body extends circumferentially about the gas turbine engine, the nacelle body forms an annular bypass duct between the nacelle body and the inner fixed structure, and the first bifurcation and the second bifurcation extend between and connect the nacelle body and the inner fixed structure; and an electrical assembly including a motor-generator, a motor control unit, a motor-generator (MG) cooling system, and a motor control unit (MCU) cooling system, the motor-generator is coupled to the shaft, the motor control unit is electrically connected to the motor-generator, the MG cooling system is connected in fluid communication with the motor-generator, the MG cooling system includes a first heat exchanger disposed at the first bifurcation within the annular bypass duct, the MCU cooling system is connected in fluid communication with the motor control unit, and the MCU cooling system includes a second heat exchanger disposed at the second bifurcation within the annular bypass duct.

2. The aircraft propulsion system of claim 1, wherein the first bifurcation forms a first heat exchanger assembly including a first bifurcation body, a first heat exchanger housing, and the first heat exchanger, the first bifurcation body and the first heat exchanger housing form a first air passage through the first heat exchanger, the first bifurcation body extends between and connects the nacelle body and the inner fixed structure, the first bifurcation body forms a first inlet of the first air passage, and the first heat exchanger housing forms a first outlet of the first air passage.

3. The aircraft propulsion system of claim 2, wherein the gas turbine engine further includes a fluid system including a third heat exchanger, the first heat exchanger assembly includes the third heat exchanger, and the first bifurcation body and the first heat exchanger housing form the first air passage through the first heat exchanger and the third heat exchanger.

4. The aircraft propulsion system of claim 3, wherein the gas turbine engine further includes a bearing assembly rotationally supporting the rotational assembly, and the bearing assembly is connected in fluid communication with the fluid system.

5. The aircraft propulsion system of claim 3, wherein the gas turbine engine includes a compressor section including the bladed compressor rotor, and the third heat exchanger is connected in fluid communication with the compressor section to receive a bleed air flow from the compressor section.

6. The aircraft propulsion system of claim 2, wherein the second bifurcation forms a second heat exchanger assembly including a second bifurcation body, a second heat exchanger housing, and the second heat exchanger, the second bifurcation body and the second heat exchanger housing form a second air passage through the second heat exchanger, the second bifurcation body extends between and connects the nacelle body and the inner fixed structure, the second bifurcation body forms a second inlet of the second air passage, and the second heat exchanger housing forms a second outlet of the second air passage.

7. The aircraft propulsion system of claim 1, wherein the gas turbine engine includes a fan section and a fan case, the fan case extends circumferentially about the rotational axis at the fan section, the nacelle body encloses the fan case, and the motor control unit is disposed on the fan case within the nacelle body.

8. The aircraft propulsion system of claim 1, wherein the MG cooling system includes a first coolant, the MCU cooling system includes a second coolant, and the first coolant is different than the second coolant.

9. The aircraft propulsion system of claim 1, wherein the MG cooling system is independent of the MCU cooling system.

10. An aircraft propulsion system comprising:

a gas turbine engine including a first rotational assembly, a second rotational assembly, and an inner fixed structure, the first rotational assembly and the second rotational assembly are rotatable about a rotational axis of the gas turbine engine, each of the first rotational assembly and the second rotational assembly includes a shaft, a bladed compressor rotor, and a bladed turbine rotor, the shaft interconnects the bladed compressor rotor and the bladed turbine rotor, the inner fixed structure forms an exterior housing of the gas turbine engine;

a nacelle including a nacelle body, a first bifurcation, and a second bifurcation, the nacelle body extends circumferentially about the gas turbine engine, the nacelle body forms an annular bypass duct between the nacelle body and the inner fixed structure, and the first bifurcation and the second bifurcation extend between and connect the nacelle body and the inner fixed structure; and an electrical assembly including a first motor-generator, a second motor-generator, a first cooling system, and a second cooling system, the first motor-generator is coupled to the first rotational assembly, the second motor-generator is coupled to the second rotational assembly, the first cooling system is connected in fluid communication with the first motor-generator, the first cooling system includes a first heat exchanger disposed at the first bifurcation within the annular bypass duct, the second cooling system is connected in fluid communication with the second motor-generator, and the second cooling system includes a second heat exchanger disposed at the second bifurcation within the annular bypass duct.

11. The aircraft propulsion system of claim 10, wherein the first bifurcation forms a first heat exchanger assembly including a first bifurcation body, a first heat exchanger housing, and the first heat exchanger, the first bifurcation body and the first heat exchanger housing form a first air passage through the first heat exchanger, the first bifurcation body extends between and connects the nacelle body and the inner fixed structure, the first bifurcation body forms a first inlet of the first air passage, and the first heat exchanger housing forms a first outlet of the first air passage.

12. The aircraft propulsion system of claim 11, wherein the gas turbine engine further includes a fluid system including a third heat exchanger, the first heat exchanger assembly includes the third heat exchanger, and the first bifurcation body and the first heat exchanger housing form the first air passage through the first heat exchanger and the third heat exchanger.

13. The aircraft propulsion system of claim 10, wherein the second bifurcation forms a second heat exchanger assembly including a second bifurcation body, a second heat exchanger housing, and the second heat exchanger, the second bifurcation body and the second heat exchanger housing form a second air passage through the second heat exchanger, the second bifurcation body extends between and connects the nacelle body and the inner fixed structure, the second bifurcation body forms a second inlet of the second air passage, and the second heat exchanger housing forms a second outlet of the second air passage.

14. The aircraft propulsion system of claim 10, wherein the electrical assembly further includes a first motor control unit and a second motor control unit, the first motor control unit is electrically connected to the first motor-generator, the first motor control unit is connected in fluid communication with the first cooling system, the second motor control unit is electrically connected to the second motor-generator, and the second motor control unit is connected in fluid communication with the second cooling system.

15. The aircraft propulsion system of claim 14, wherein the gas turbine engine includes a fan section and a fan case, the fan case extends circumferentially about the rotational axis at the fan section, the nacelle body encloses the fan case, and the first motor control unit and the second motor control unit are disposed on the fan case within the nacelle body.

16. The aircraft propulsion system of claim 10, wherein the first cooling system is independent of the second cooling system.

* * * * *